US012574247B2

(12) United States Patent　(10) Patent No.: US 12,574,247 B2
Shim　(45) Date of Patent: Mar. 10, 2026

(54) DEVICE FOR COMPUTING SOLUTIONS OF LINEAR SYSTEMS AND ITS APPLICATION TO DIGITAL SIGNATURE GENERATIONS

(71) Applicant: INSTITUTE FOR BASIC SCIENCE, Daejeon (KR)

(72) Inventor: Kyung Ah Shim, Daejeon (KR)

(73) Assignee: INSTITUTE FOR BASIC SCIENCE, Daejeon (KR)

( * ) Notice: Subject to any disclaimer, the term of this patent is extended or adjusted under 35 U.S.C. 154(b) by 312 days.

(21) Appl. No.: 17/978,147

(22) Filed: Oct. 31, 2022

(65) Prior Publication Data

US 2024/0007298 A1　Jan. 4, 2024

(30) Foreign Application Priority Data

Jul. 1, 2022　(KR) ........................ 10-2022-0081048

(51) Int. Cl.
H04L 9/32　(2006.01)
G06F 17/12　(2006.01)
G06F 17/16　(2006.01)
H04L 9/00　(2022.01)
H04L 9/08　(2006.01)

(52) U.S. Cl.
CPC ............ H04L 9/3247 (2013.01); G06F 17/12 (2013.01); G06F 17/16 (2013.01); H04L 9/0861 (2013.01); H04L 9/50 (2022.05)

(58) Field of Classification Search
CPC . H04L 9/08; H04L 9/0861; H04L 9/32; H04L 9/3247; H04L 9/50
See application file for complete search history.

(56) References Cited

U.S. PATENT DOCUMENTS

| | | | |
|---|---|---|---|
| 2005/0048463 A1* | 3/2005 | Deng ..................... | G16B 40/00 |
| | | | 435/6.14 |
| 2009/0010428 A1* | 1/2009 | Delgosha .............. | H04L 9/0844 |
| | | | 380/30 |
| 2021/0167969 A1* | 6/2021 | Cheon ................... | H04L 9/0869 |
| 2024/0187061 A1* | 6/2024 | Huang ................... | H04B 7/024 |
| 2024/0205007 A1* | 6/2024 | Cheon ................... | H04L 9/3093 |
| 2024/0372708 A1* | 11/2024 | Fukami .................. | G06F 17/12 |

FOREIGN PATENT DOCUMENTS

| | | | | |
|---|---|---|---|---|
| EP | 3829102 A1 * | 6/2021 | .......... | G06F 21/602 |
| KR | 101768641 B1 * | 8/2017 | | |

* cited by examiner

*Primary Examiner* — Amie C. Lin
*Assistant Examiner* — Ayub A Maye
(74) *Attorney, Agent, or Firm* — Maschoff Brennan

(57) ABSTRACT

Disclosed is an electronic device for computing a solution to a linear system using a block matrix. The electronic device includes a memory configured to store data, and a processor configured to perform a plurality of operations by executing instructions. The electronic device computes the solution to the linear system without directly computing an inverse matrix $R^{-1}$ of a block matrix R, using an inverse matrix of at least one of a plurality of sub-blocks matrices A, B, C, and D that constitute a block matrix R representing the linear system, and an inverse matrix of at least one of combinations of the plurality of sub-block matrices A, B, C, and D. According, the solution to the linear system can be efficiently computed.

16 Claims, 4 Drawing Sheets

【Fig. 1】
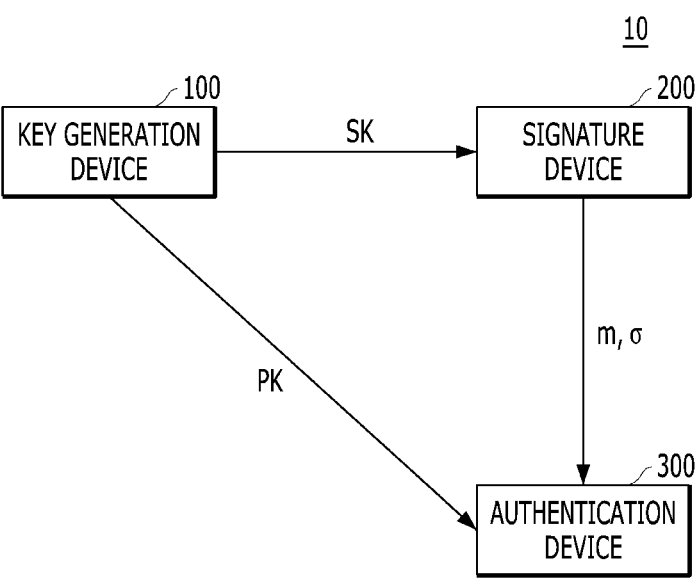
【Fig. 2】
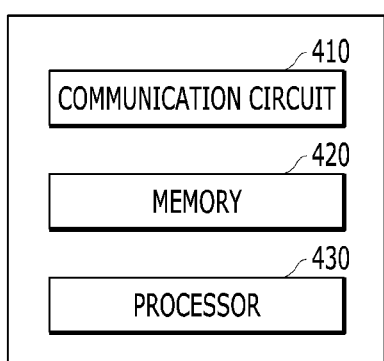

【Fig. 3】
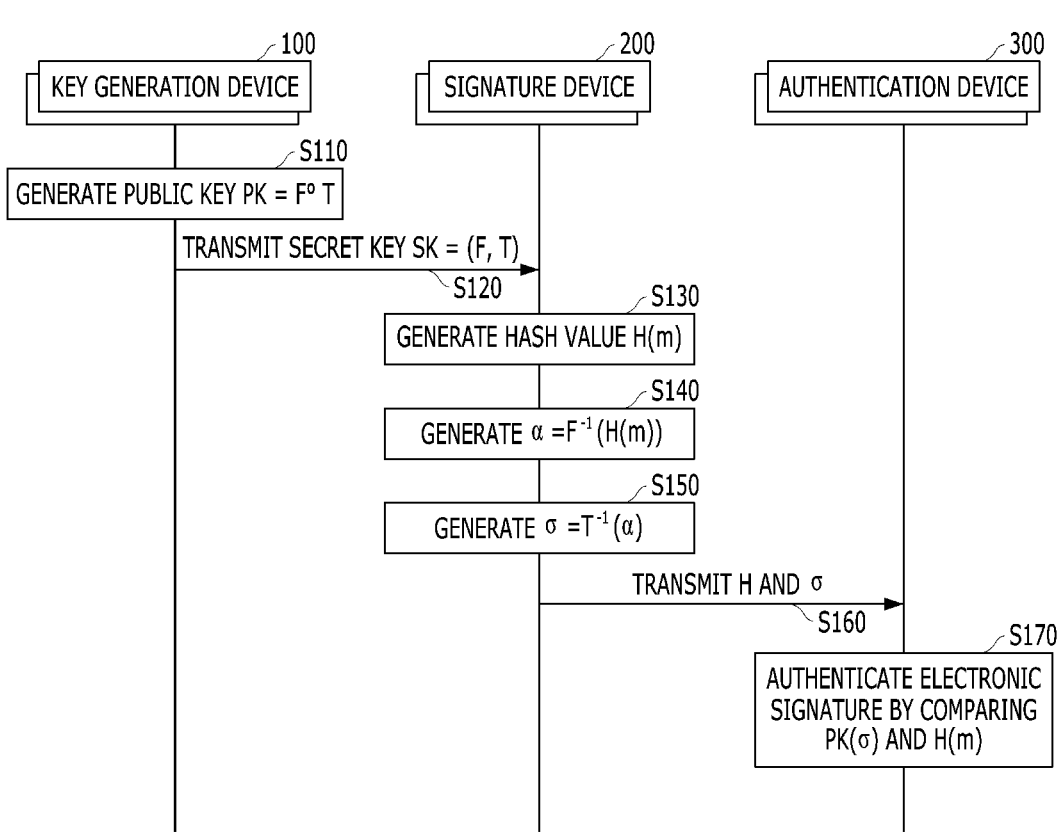

【Fig. 4】
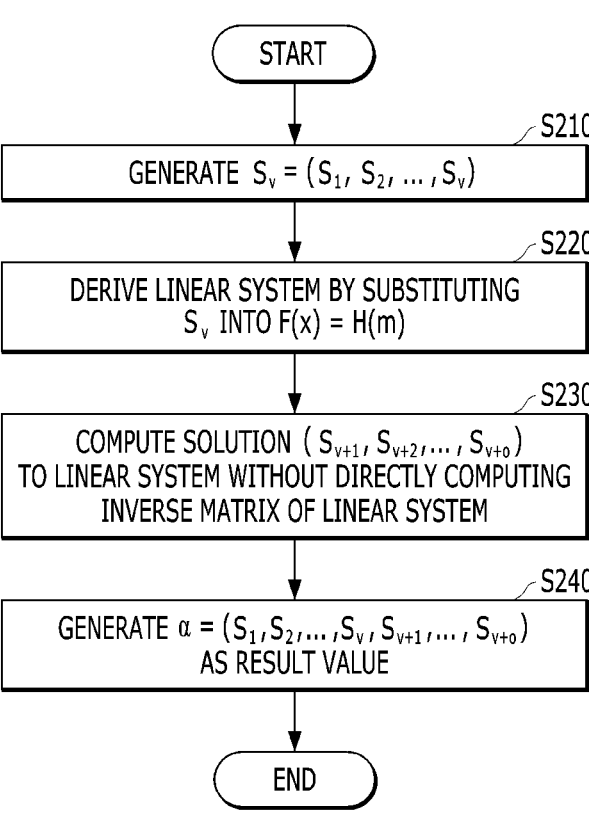

【Fig. 5】
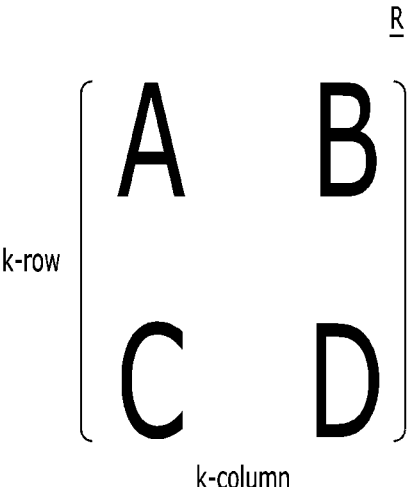
$$\underline{R}$$
k-row
$$\begin{bmatrix} A & B \\ C & D \end{bmatrix}$$
k-column
【Fig. 6】
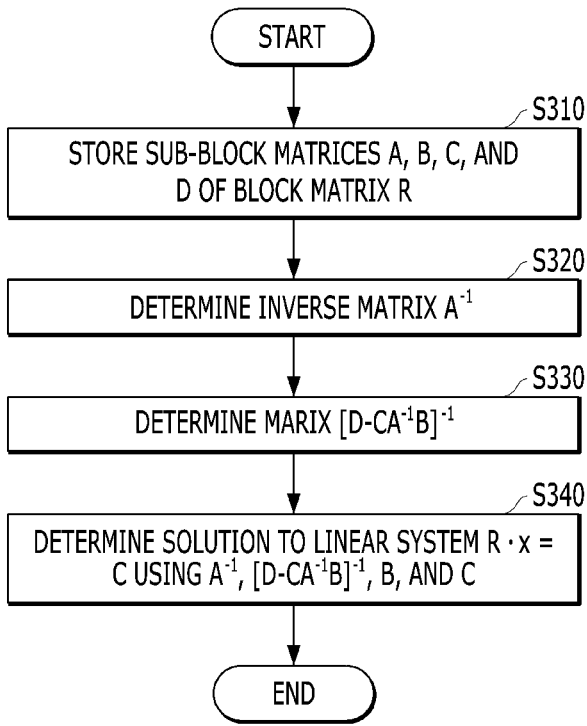
START
STORE SUB-BLOCK MATRICES A, B, C, AND D OF BLOCK MATRIX R — S310
DETERMINE INVERSE MATRIX $A^{-1}$ — S320
DETERMINE MARIX $[D-CA^{-1}B]^{-1}$ — S330
DETERMINE SOLUTION TO LINEAR SYSTEM $R \cdot x = C$ USING $A^{-1}$, $[D-CA^{-1}B]^{-1}$, B, AND C — S340
END

DEVICE FOR COMPUTING SOLUTIONS OF LINEAR SYSTEMS AND ITS APPLICATION TO DIGITAL SIGNATURE GENERATIONS

TECHNICAL FIELD

The present disclosure relates to a device for computing a solution to a linear system and a device for generating an electronic signature on the basis of the solution to the linear system.

BACKGROUND ART

A multivariate quadratic signature means an electronic signature (or is referred to as a "digital signature") that is used in a multivariate cryptography system. The multivariate cryptography system here means an asymmetric cryptography system based on multivariate polynominals defined in terms of a finite field. Particularly, the multivariate cryptography system in which the multivariate polynominals, each having a degree of 2, are used is referred to as a multivariate quadratic cryptography system.

The electronic signature is generated by applying an inverse element of a secret key to a message. For example, in the case of a multivariate quadratic signature, a solution to a linear system that is obtained from the secret key has to be computed. At this point, it takes much time to compute the solution to the linear system. Consequently, it takes much time to generate the electronic signature. Particularly, the more increased a magnitude of the secret key, the more time it takes to generate the electronic signature.

SUMMARY OF INVENTION

Technical Problem

An object of the present disclosure is to provide a device for efficiently computing a solution to a linear system using a block matrix and a device for generating an electronic signature on the basis of the solution to the linear system.

Solution to Problem

According to an aspect of the present disclosure, there is provided an electronic device for computing a solution to a linear system that uses a block matrix, the electronic device including: a memory configured to store data; and a processor configured to perform a plurality of operations by executing instructions, wherein the plurality of operations include: storing a plurality of sub-block matrices A, B, C, and D that constitute a block matrix R; and computing the solution to the linear system without directly computing an inverse matrix $R^{-1}$ of the block matrix R corresponding to the linear system, using an inverse matrix of at least one of the sub-block matrices A, B, C, and D and an inverse matrix of at least one of combinations of the sub-block matrices A, B, C, and D, and wherein the block matrix R is a square matrix with k (k is an even number) rows and k columns, and the sub-block matrices A, B, C, and D are square matrices, each with k/2 rows and k/2 columns.

According to another aspect of the present disclosure, there is provided a signature device configured to generate an electronic signal, the signature device including: a communication circuit configured to transmit and receive data; a memory configured to store data; and a processor configured to perform a plurality of operations by executing instructions, wherein the plurality of operations include reading a secret key; and generating the electronic signature on a message using the secret key, wherein the secret key contains a central map F that is based on o multivariate quadratic polynominals ($f^{(1)}$, $f^{(2)}$, . . . , $f^{(o)}$) that is defined in a first index set V={1, 2, . . . v} and a second index set O={v+1, v+2, . . . v+o} (where v and o are natural numbers), and an invertible map T, and wherein a coefficient of a quadratic term defined in terms of the second index set of the o multivariate quadratic polynominals ($f^{(1)}$, $f^{(2)}$, . . . , $f^{(o)}$) is 0.

According to still another aspect of the present disclosure, there is provided a method of generating an electronic signature using an electronic device, the method including: inputting a message; reading a secret key; and generating an electronic signature on the message using the secret key, wherein the secret key contains a central map F that is based on o multivariate quadratic polynominals ($f^{(1)}$, $f^{(2)}$, . . . , $f^{(o)}$) that is defined in a first index set V={1, 2, . . . v} and a second index set O={v+1, v+2, . . . v+o} (where v and o are natural numbers), and an invertible map T, and wherein a coefficient of a quadratic term defined in terms of the second index set of the o multivariate quadratic polynominals ($f^{(1)}$, $f^{(2)}$, . . . , $f^{(o)}$) is 0.

The methods according to the embodiments of the present disclosure may be realized in the form of a program that is stored on a computer-readable storage medium.

Advantageous Effects

In embodiments of the present disclosure, an electronic signature can be generated using a central map that is expressed as multivariate quadratic polynominals. Thus, the effect of possibly providing the security-enhanced electronic signature can be achieved.

In the embodiments of the present disclosure, the electronic signature can be generated using an inverse map of the central map that is expressed as multivariate quadratic polynominals. A process of computing the inverse map of the central map can be performed using a linear system. Thus, the effect of possibly reducing an amount of arithmetic operation can be achieved.

In the embodiments of the present disclosure, the linear system can be used in a process of computing the inverse map of the central map that is expressed as the multivariate quadratic polynominals. Thus, the effect of possibly effectively deriving a solution to the linear system can be derived.

BRIEF DESCRIPTION OF DRAWINGS

FIG. 1 is a view illustrating an electronic signature system according to embodiments of the present disclosure.

FIG. 2 is a view illustrating a key generation device, a signature device, and an authentication device according to embodiments of the present disclosure.

FIG. 3 is a view that is referred to for description of operation of the electronic signature system according to the embodiments of the present disclosure.

FIG. 4 is a flowchart illustrating a method of computing a first result value according to embodiments of the present disclosure.

FIG. 5 is a view illustrating a block matrix that is used in a linear system according to embodiments of the present disclosure.

FIG. 6 is a flow chart illustrating a method of computing a solution to a linear system according to the embodiments of the present disclosure.

DESCRIPTION OF EMBODIMENTS

Preferred embodiments of the present disclosure will be described in detail below with reference to the accompanying drawings.

The preferred embodiments of the present disclosure are provided to enable a person of ordinary skill in the art to get a full understanding of the present disclosure and may be modified in various different forms. However, the scope of the present disclosure is not limited to the preferred embodiments. The preferred embodiments of the present disclosure are provided to contain sufficient disclosure and to assist in giving the technical idea of the present disclosure.

Terms for describing the preferred embodiments of the present disclosure are used in the present specification to describe and are not intended to impose any limitation on the present disclosure. Unless specially stated otherwise throughout the present specification, a singular noun or a singular noun phrase may have a plural meaning.

When a layer (film), region, pattern or structure is described as being formed "on" or "under" any other substrate, layer (film), region, pad, or pattern, a third layer may or may not be interposed between a layer (film), region, pattern or structure and any other substrate, layer (film), region, or pattern. In addition, a position of a layer before which the preposition "on" or "under" is used is defined with respect to the drawings.

The drawings are provided only for helping get an understanding of the idea of the present disclosure and should not be interpreted as imposing any limitation on the scope of the present disclosure. In addition, for clarity and convenience in description, relative thicknesses or lengths of lines or sizes of constituent elements may be illustrated in non-exact proportion in the drawings.

In the present specification, a quadratic polynominal means an equation that is made up of variables, linear terms of the variables, quadratic terms of the variables, and a linear combination of constants (or a linear combination thereof).

In the present specification, a field is one of algebra structures and is closed to four fundamental arithmetic operations. The field means a set in which an identity element is present for each of the four fundamental arithmetic operations. At this point, a finite field means a field that contains a finite number of elements that constitute the field, that is, a field that has a finite order.

In the present specification, when a polynominal is defined in terms of the finite field, this means that a coefficient of the polynominal is made up of elements contained in the finite field. That is, unless otherwise specifically mentioned in the present specification, description is provided on the assumption that the polynominal is defined in terms of the finite field.

In the present specification, for a field F, F* means a field that contains only elements each of which has a multiplicative inverse, among elements contained in the field F.

In the present specification, $f:X \rightarrow Y$ means a map or a function f that matches elements in a domain X with elements in a codomain Y, respectively.

In the present specification, two index sets for representing an index are defined. A first index set is $V=\{1, 2, \ldots v\}$, and a second index set is $O=\{v+1, v+2, \ldots v+o\}$. In these sets, v and o are natural numbers.

FIG. 1 is a view illustrating an electronic signature system according to a embodiments of the present disclosure. With reference to FIG. 1, an electronic signature system 10 according to the present disclosure may support an electronic signature scheme based on a multivariate quadratic.

The electronic signature system 10 may include a key generation device 100, a signature device 200, and an authentication device 300. These devices 100, 200, and 300 each have a processor having an arithmetic-operation processing function, a memory capable of storing data, and a communication circuit capable of transmitting and receive the data. Each of these devices 100, 200, and 300 may perform its operation by its process executing an instruction stored in its memory and may transmit and receive data to and from an external device through its communication circuit.

Configurations of the devices 100, 200, and 300 will be described below.

The key generation device 100 may generate a public key PK and a secret key SK that are used in the electronic signature system 10, and may store the generated public key PK and secret key SK. The public key PK is a key which can be accessed and used by an arbitrary user. The public key PK is a key that is used to authenticate an electronic signature. The secret key SK is provided in private only to a specific user and is used when generating the electronic signature. The secret key SK may correspond to the public key PK.

In the embodiments, a security level k may be input into the key generation device 100, and the key generation device 100 may generate the public key PK and the secret key SK on the basis of the input security level k. The security level k is a parameter for determining security of the electronic signature system 10 and is a value that is used to set a size (that is, a key length or the number of bits) of the public key PK and/or the secret key SK.

For example, the public key PK may be a map including multivariate quadratics, but is not limited thereto.

The key generation device 100 may transmit the public key PK to the signature device 200 and/or the authentication device 300. In addition, the key generation device 100 may transmit the secret key SK to the signature device 200.

The signature device 200 may receive the public key PK and/or the secret key SK that is transmitted by the key generation device 100. The signature device 200 may generate an electronic signature σ on a message m using the secret key SK.

In the embodiments, the signature device 200 may generate (or receive as an input) the message m and generate a hash message H(m) by applying a hash function H to the generated message m. At this point, the hash function H is a one-way function that matches arbitrary-length data with fixed-length data. The hash function H may be publicly available for the signature device 200 and the authentication device 300.

The signature device 200 may generate the electronic signature σ on the hash message H(m) using the secret key SK. In the embodiments, the hash message H(m) and the electronic signature σ may be stored in the memory 220.

The signature device 200 may transmit the message m and the electronic signature σ to the authentication device 300 for electronic-signature authentication.

It is illustrated in FIG. 1 that the key generation device 100 and the signature device 200 are positioned separately from each other. However, in the embodiments, the key generation device 100 and the signature device 200 may be integrally combined into one device.

For example, one cryptography device described above may be a device that is capable of performing both a function of the key generation device 100 and a function of the signature device 200. For example, the cryptography device described above may generate the secret key SK and the public key PK, may transmit the public key PK to the authentication device 300, may generate the electronic signature σ, and may transmit the message m and the electronic signature σ to the authentication device 300.

The authentication device 300 may receive the public key PK. In the embodiments, the public key PK may be transmitted from the signature device 200, but is not limited thereto. For example, the public key PK may be downloaded from a web server or may be carried through a specific storage medium for being stored.

The authentication device 300 may receive the message m, the hash message H(m), and the electronic signature σ from the signature device 200 and may store them.

The authentication device 300 may compare a value Pk(σ), resulting from applying the public key PK to the electronic signature σ, with the hash message H(m). When the value Pk(σ) and the hash message H(m) are the same, the authentication device 300 may authenticate that the electronic signature σ is a signature that is effective with respect to the message m.

FIG. 2 is a view illustrating the key generation device 100, the signature device 200, and the authentication device 300 according to embodiments of the present disclosure. With reference to FIG. 2, a device 400 may refer to any one of the key generation device 100, the signature device 200, and the authentication device 300.

The device 400 may include a communication circuit 410, a memory 420, and a processor 430.

The communication circuit 410 may transmit and receive data to and from an external device. In the embodiments, the communication circuit 410 may transmit and receive data in compliance with a wired communication protocol and a wireless communication protocol. For example, the communication circuit 410 may transmit and receive data, such as the keys PK and SK, the hash function H, the message m, and the electronic signature σ that are used for the electronic signature, that are used in the electronic signature system 10.

Data necessary for operation of the device 400 may be stored in the memory 420. In the embodiments, a program that includes instructions performing at least one of an operation of generating a key, an operation of generating an electronic signature, and an operation of authenticating the electronic signature may be stored in the memory 420. The device 400 may execute the program stored in the memory 420 and thus may perform at least one of the operation of generating the key, the operation of generating the electronic signature, and the operation of authenticating the electronic signature.

The memory 420 may be a volatile memory or a nonvolatile memory.

The processor 430 may control an overall operation of the device 400. In the embodiments, the processor 430 may have an arithmetic-operation processing function and may perform a specific operation. For example, the processor 430 may execute the program stored in the memory 420 and may perform at least one of the operation of generating the key, the operation of generating the electronic signature, and the operation of authenticating the electronic signature that are requested by the instructions included in the executed program.

For example, the processor 430 may be any one of a central processing unit (CPU), a micro controller unit (MCU), a field programmable gate array (FPGA), an application specified integrated circuit (ASIC), and a graphical processing unit (GPU), but the embodiments of the present disclosure is not limited thereto.

Operation of the device 400 according to the embodiments of the present disclosure may be realized as a type of program that is stored in a computer-readable nonvolatile storage medium.

FIG. 3 is a view that is referred to for description of operation of the electronic signature system according to the embodiments of the present disclosure. With reference to FIG. 3, the key generation device 200 may generate the public key PK (S110). In the embodiments, the key generation device 200 may generate two maps F and T and may generate the public key PK by compositing the two maps F and T. At this point, the two maps F and T may be a central map F and an invertible map T, respectively. For example, the two maps F and T may be maps for realizing an unbalanced oil-vinegar electronic signature scheme, but are not limited thereto.

The central map F may be a map that has a quadratic polynominal. For example, the central map F may be a map that is expressed as o (o is a natural number) quadratic polynominals $f^{(k)}(x)$ (k=1, 2, ... o) according to Equation 1 that follows.

$$F: \mathbb{F}_q{}^n \rightarrow \mathbb{F}_q{}^m, F=(f^{(1)}, f^{(2)}, \ldots, f^{(o)}) \qquad \text{Equation 1}$$

Quadratic polynominals $f^{(k)}(x)$ that constitute the central map F may have a special form. In the embodiments, quadratic polynominals $f^{(k)}(x)$ may have a form (that is, a form in which a quadratic can be dimension-reduced to a linear expression) in which a multivariate quadratic system can be expressed as a linear system when an arbitrary value is substituted into at least one portion of a component of a variable x of the multivariate quadratic system that is expressed as an expression F(x)=C (C is an arbitrary constant vector).

In the embodiments, a $x_i x_j (i, j \in W \times W, W \subseteq V \cup O)$ term in quadratic polynominals $f^{(k)}(x)$ of the central map F may have a coefficient of 0. For example, quadratic polynominals $f^{(k)}(x)$ may be defined according to Equation 2 that follows.

$$f^{(k)}(x) = \qquad\qquad \text{Equation 2}$$

$$\sum_{i \in O, j \in V} \alpha_{ij}^{(k)} x_i x_j + \sum_{i, j \in V, i \leq j} \beta_{ij}^{(k)} x_i x_j + \sum_{i \in V \cup O} \gamma_i^{(k)} x_i + \eta_i^{(k)}$$

$$(V = \{1, 2, \ldots v\}, O = \{v+1, v+2, \ldots v+o\}, m = o, n = v+o)$$

The quadratic polynominals $f^{(k)}(x)$ of the central map F defined according to Equation 2 may be quadratic polynominals in which a partial quadratic term $x_i x_j$ (i, j∈O) is not present. That is, a coefficient for the partial quadratic term $x_i x_j$ (i, j∈O) of the quadratic polynominals $f^{(k)}(x)$ may be 0. That is, a coefficient of a quadratic term that is defined in terms of the second index sets in the o multivariate quadratic polynominals $(f^{(1)}, f^{(2)}, \ldots, f^{(o)})$ may be 0. Accordingly, the central map F that is defined according to Equations 1 and 2 is invertible.

Polynominals that constitute Equation 2 may each be expressed as follows.

$$f_{OV}{}^{(k)} = \sum_{i \in O, j \in V} \alpha_{ij}{}^{(k)} x_i x_j$$

$$f_V{}^{(k)} = \sum_{i, j \in V, i \leq j} \beta_{ij}{}^{(k)} x_i x_j$$

$$f_{L,C}{}^{(k)} = \sum_{i \in V \cup O} \gamma_i{}^{(k)} x_i + \eta_i{}^{(k)}$$

At this point, coefficients contained in each of the polynominals $f_{OV}{}^{(k)}$, $f_V{}^{(k)}$ and $f_{L,C}{}^{(k)}$ may be arbitrarily selected.

The polynominals $f_{OV}^{(k)}$ and $f_V^{(k)}$ may have a special form. When generating the secret key by using the special form of polynominals $f_{OV}^{(k)}$ and $f_V^{(k)}$, a length of the secret key may be reduced without decreasing of security. Thereby, the generation of signature may be performed in efficient way.

In the embodiment, some coefficients contained in each of the polynominals $f_{OV}^{(k)}$ and $f_V^{(k)}$ may be 0 (i.e., some quadratic terms of the polynominals $f_{OV}^{(k)}$ and $f_V^{(k)}$ do not exist). At this point, the other non-zero coefficients may be determined in such a manner that a rank of a matrix corresponding to a quadratic (or a quadratic term) of $f_{OV}^{(k)}$ and $f_V^{(k)}$ is a full rank. For example, the matrix corresponding to the quadratic of $f_{OV}^{(k)}$ and $f_V^{(k)}$ may be symmetric.

For example, the polynominal $f_{OV}^{(k)}$ may be defined according to Equation 2-1 that follows.

$$f_{OV}^{(k)} = \sum_{i=1}^{o} \alpha_{sp,i}^{(k)} x_{v+i} x_{(i+k-1(mod\ o))+v+1} \qquad \text{Equation 2-1}$$

where $\alpha_{sp,i}^{(k)}$ ($i=1,\ldots,v$ and $k=1,\ldots,o$) is an element of $F_q$ that is not 0.

In addition, for example, the polynominal $f_V^{(k)}$ may be defined according to Equation 2-2 that follows.

$$f_V^{(k)} = \sum_{i=1}^{o} \beta_{sp,i}^{(k)} x_i x_{(i+k-1(mod\ o))+1} \qquad \text{Equation 2-2}$$

where $\beta_{sp,i}^{(k)}$ ($i=1,\ldots,v$ and $k=1,\ldots,o$) is an element of $F_q$ that is not 0. Equation 2 may be referred to as a normal form, and Equations 2-1 and 2-2 may be referred to as a special form. In a case where special forms, such as Equations 2-1 and 2-2, are used, the length of the key (secret key) may be decreased, and thus the effect of being able to efficiently generate a signature can be achieved.

When Equations 2 and 2-1 and 2-2 are considered comprehensively, a total of four combinations of the quadratic polynominals $f^{(k)}(x)$ of the central map F according to the embodiments of the present disclosure may be selected, and the embodiments of the present disclosure is not limited to any one selected combination.

| | $f_{OV}^{(k)}$ | $f_V^{(k)}$ |
|---|---|---|
| CASE 1 | Normal | Normal |
| CASE 2 | Special | Normal |
| CASE 3 | Normal | Special |
| CASE 4 | Special | Special |

The invertible map T may be an invertible map that, as the name implies, has its inverse map. In the embodiments, the invertible map T may be an arbitrary map that is directed from the domain $\mathbb{F}_q^{\,n}$ to the codomain $\mathbb{F}_q^{\,n}$. For example, the invertible map T may be an invertible affine map or an invertible linear map.

The key generation device 200 may generate the public key PK by compositing the two maps F and T. The two maps F and T are both invertible, and thus the public key K that is a composite map of the two maps F and T is also invertible. A form of the central map F defined according to Equation 2 is a special form (distinct form), and thus, the inverse map $F^{-1}$ of the central map F can be easily derived.

However, the public key PK is configured as the composite map of the two maps F and T, and thus, the inverse map, that is, the secret key SK, cannot be easily derived. Therefore, security of the public key PK can be guaranteed.

The key generation device 100 may transmit the secret key SK to the signature device 200 (S200). In the embodiments, the key generation device 100 may transmit each of the two maps F and T to the signature device 200. Unlike the public key PK that is the composite map of the two maps F and T, the secret key SK contains the pre-compositing two maps F and T.

The signature device 200 may generate a hash value H(m) for the message m (S130). In the embodiments, the signature device 200 may generate the hash value H(m) by applying a predetermined hash function H to the message m. At this point, the hash function H may be a function in an arbitrary one direction that is directed from a domain {0, 1}* to a codomain $\mathbb{F}_q^{\,m}$.

In the embodiments, the signature device 200 may generate the hash value H(m, r) by applying a random salt r to the message m. The random salt r is an element for further enhancing security of the message. For example, the random salt r may be bit data having the security level k in length. The signature device 200 may apply the hash function H after concatenating the random salt r to a rear end of the message m.

The signature device 200 may generate a first result value $\alpha=F^{-1}(H(m))$ of an inverse map $F^{-1}$ of the central map F, with the hash value H(m) as an input (S140). That is, the signature device 200 may compute the first result value $\alpha$ that satisfies $F(\alpha)=H(m)$. This computation will be described below.

The signature device 200 may generate a second result value $\sigma=T^{-1}(\alpha)$ of the inverse map $T^{-1}$ of the invertible map T, with the first result value $\alpha$ as an input (S150). That is, the signature device 200 may compute the second result value $\sigma$ that satisfies $T(\sigma)=\alpha$. At this point, the invertible map T is the invertible affine map, it may not be difficult to compute the inverse map $T^{-1}$ of the invertible map T.

The signature device 200 may generate the second result value $\sigma$ as the electronic signature for the message m.

The signature device 200 may transmit the message m and the electronic signature $\sigma$ to the authentication device 300 (S160). In the embodiments, in a case where the random salt r is additionally used, the signature device 200 may transmit the random salt r, together with the message m and the electronic signature $\sigma$, to the authentication device 300.

The authentication device 300 may compare a value PK($\sigma$) that results from applying the public key PK to the electronic signature $\sigma$, and the hash value H(m) generated from the received message m, and thus may authenticate the electronic signature (S170). In the embodiments, the authentication device 300 may perform computation by substituting the electronic signature $\sigma$ into the public key PK received from the key generation device 100, and may authenticate the electronic signature by comparing a result of the computing and the generated hash value H(m). In a case where the random salt r is additionally used, the authentication device 300 may compare a result of the computing by substituting the electronic signature $\sigma$ into the public key PK and the hash value H(m, r) generated from the message m and the random salt r with each other and thus may authenticate the electronic signature.

In a case where a value resulting from substituting the electronic signature $\sigma$ into the public key PK is the same as the hash value H(m), the authentication device 300 may authenticate that the electronic signature is effective. Conversely, in a case where the value resulting from substituting the electronic signature σ into the public key PK is not the same as the hash value H(m), the authentication device 300 may determine that the electronic signature is not effective.

With reference to FIG. 3, in generating the electronic signature σ, the first result value $\alpha=F^{-1}(H(m))$ of the inverse map $F^{-1}$ of the central map F is necessary, with the hash value H(m) as an input. At this point, the inverse map $F^{-1}$ of the central map F is required to be computed. The central map F is a map that is made up of multivariate quadratic polynominals, and thus, a large amount of computing is required to obtain the inverse of the central map F. Particularly, the more enhanced security of the electronic signature, the more increased a size (a magnitude of a matrix that is made up of coefficients that constitute the central map F) of the central map F. Accordingly, it takes more time to compute the inverse of the central map F. Consequently, it takes more time to compute the electronic signature, and thus, a speed of the electronic signature system may be reduced.

According to the embodiments of the present disclosure, the inverse of the central map F may be efficiently computed. Thus, the effect of efficiently generating the electronic signature can be achieved.

FIG. 4 is a flowchart illustrating a method of computing the first result value according to embodiments of the present disclosure. The method of computing the first result value in FIG. 4 may be performed by the signature device 200.

The signature device 200 may generate $s_V=(s_1, s_2, \ldots, s_v)\in \mathbb{F}_q^v$ (S210). In the embodiments, the signature device 200 may randomly generate $s_V=(s_1, s_2, \ldots, s_v)$.

The signature device 200 may derive a linear system by substituting the generated $s_V$ into an equation that is made up of the central map F and the hash value H(m) (S220). In the embodiments, the signature device 200 may derive a linear system for a variable $(x_{v+1}, x_{v+2}, \ldots, x_{v+o})$ by substituting $s_V$ into $x=(x_1, x_2, \ldots x_v, \ldots, x_{v+o})\in \mathbb{F}_q^m$ of Equation F(x)=H(m).

In the embodiments, the central map F may contain quadratic polynominals $f^{(k)}(x)$ (1≤k≤o) that do not contain the partial quadratic term $x_ix_j$ (i,j∈O) (for example, Equation 2). In this case, these quadratic polynominals may be converted into a linear system for the variable $(x_{v+1}, x_{v+2}, \ldots, x_{v+o})$. For example, a linear system according to Equation 3 that follows may be derived from Equation $F((x_{v+1}, x_{v+2}, \ldots, x_{v+o}),s_V)=H(m)$.

$$R \cdot x=c, x=(x_{v+1},x_{v+2}, \ldots, x_{v+o})^T \text{ and } c=(c_1, \ldots, c_o)^T \quad \text{Equation 3}$$

where R may be a matrix representing a linear system, that is, a square matrix with o rows and o columns, and $c_1$, $c_2, \ldots, c_{v+o}$ may be a constant. In Equation 3, $c_1$, $c_2, \ldots, c_o$ may be a constant that is generated by calculating through an arithmetic operation a constant, calculated by substituting $s_V=(s_1, s_2, \ldots, s_v)$ into each of the quadratic polynominals $f^{(k)}(x)$ (1≤k≤o), and the hash value H(m). The signature device 200 may compute $x=(s_{v+1}, s_{v+2}, \ldots s_{v+o})^T$ that is a solution to the derived linear system (S230). In the embodiments, the signature device 200 may compute $x=R^{-1}\cdot c$ that is a solution to a linear system R·x=c.

In a case where the solution to the linear system (that is, Equation 3) for $s_v=(s_1, s_2, \ldots, s_v)$ that is generated is not present, the signature device 200 may generate another $s_V$ and may perform Step S220 and S230. The signature device

200 may generate $s_V$ until the solution to the solution to the linear system $s_V=(s_1, s_2, \ldots, s_v)$ is present.

An amount of computing associated with the generation of the first result value $F^{-1}(H(m))$ accounts for the largest portion of an amount of computing necessary for the generation of the electronic signature according to the embodiments of the present disclosure. An amount of computing associated with in S230 accounts for the largest portion of an amount of computing for the generation of the first result value. Therefore, there is a need to efficiently generate the first result value in order to efficiently generate the electronic signature.

The signature device 200 may generate $(s_1, s_2, \ldots, s_v, s_{v+1}, \ldots, s_{v+o})$ as a first result value α (S240). That is, the signature device 200 may generate the first result value α on the basis of a randomly generated variable $s_V=(s_1, s_2, \ldots, s_v)$ and $(s_{v+1}, s_{v+2}, \ldots s_{v+o})$ that is the computed solution to the linear system.

As described with reference to FIG. 4, the speed of the electronic signature in the electronic signature system according to the embodiments of the present disclosure depends on an amount of arithmetic operation on $x=R^{-1}\cdot c$ that is the solution to the linear system R·x=c. Therefore, the electronic signature may be efficiently generated by efficiently computing $x=R^{-1}\cdot c$ that is the solution to the linear system. A method of efficiently computing $x=R^{-1}\cdot c$ that is the solution to the linear system according to embodiments of the present disclosure will be described below.

FIG. 5 is a view illustrating a matrix representing the linear system according to the embodiments of the present disclosure. A matrix R illustrated in FIG. 5 may be a matrix representing the linear system derived by substituting an arbitrary value (for example, $s_v$ mentioned above) into at least one portion of a variable x of Equation F(x)=H(m) for the electronic signature.

The matrix R may be a square matrix with k (k is an even number) rows and k columns. The matrix R is a block matrix that is made up of 4 sub-block matrices A, B, C, and D. Each of the sub-block matrices A, B, C, and D may be a square matrix with k/2 rows and k/2 columns. In a case where the central matrix F is defined according to Equation 2, k is o. However, k will be used below on the assumption that a general case is described.

According to the embodiments of the present disclosure, the solution to the linear system will be efficiently computed. Specifically, according to the embodiments of the present disclosure, when computing the solution to the linear system that is expressed as a block matrix with an even number of rows and an even number of columns, the solution to the linear system may be computed without computing an entire inverse matrix of the block matrix.

According to the embodiments of the present disclosure, the linear system R x=c for the matrix R may be derived from the central map that is expressed as multivariate quadratic polynominals. In addition, according to the embodiments of the present disclosure, when computing the solution to the linear system R·x=c, the solution $x=R^{-1}\cdot c$ may be computed directly and efficiently without directly deriving an inverse matrix $R^{-1}$. Accordingly, the solution to the linear system may be computed with a less amount of arithmetic operation than when the inverse matrix is directly obtained.

When the inverse matrix $R^{-1}$ is described as not being directly derived throughout the present specification, this means that, in computing the solution to the linear system R·x=c is computed, the entire inverse matrix $R^{-1}$, that is, all elements of the inverse matrix $R^{-1}$, is not computed. Specifically, according to the embodiments of the present disclosure, the effect of computing a complete solution to the linear system R·x=c by computing only one portion of the inverse matrix $R^{-1}$ can be achieved. Particularly, according to the embodiments of the present disclosure, the effect of possibly computing the solution to the linear system R·x=c using respective inverse matrices of the sub-block matrices, each having a magnitude that is half a magnitude of the block matrix R, can be achieved. For example, according to the embodiments of the present disclosure, the respective inverse matrices of the sub-block matrices of the block matrix R are computed, or multiplication of the inverse matrix by a vector is performed. Thus, the effect of possibly computing the solution to the linear system R·x=c without computing all elements of the inverse matrix $R^{-1}$ can be achieved.

The method of deriving the solution according to the embodiments of the present disclosure will be described below.

According to Equation 4 that follows, the matrix R may be decomposed into multiplications of a plurality of matrices.

$$R = \begin{pmatrix} A & B \\ C & D \end{pmatrix} = \begin{pmatrix} I & O \\ CA^{-1} & I \end{pmatrix} \begin{pmatrix} A & O \\ O & D-CA^{-1}B \end{pmatrix} \begin{pmatrix} I & A^{-1}B \\ O & I \end{pmatrix} \quad \text{Equation 4}$$

In Equation 4, I is an identity matrix and O is a zero matrix.

Accordingly, $R^{-1}$ may be expressed in the form of Equation 5 that follows.

$$R^{-1} = \qquad\qquad\qquad\qquad\qquad \text{Equation 5}$$
$$\begin{pmatrix} I & -A^{-1}B \\ O & I \end{pmatrix} \begin{pmatrix} A^{-1} & O \\ O & [D-CA^{-1}B]^{-1} \end{pmatrix} \begin{pmatrix} I & O \\ -CA^{-1} & I \end{pmatrix}$$

According to Equation 5, Equation 6 that follows may be used in order to perform multiplication of $R^{-1}$ by c=$(c_1, \ldots, c_k)^T$.

$$R^{-1} \cdot c = \qquad\qquad\qquad\qquad \text{Equation 6}$$
$$\begin{pmatrix} I & -A^{-1}B \\ O & I \end{pmatrix} \begin{pmatrix} A^{-1} & O \\ O & [D-CA^{-1}B]^{-1} \end{pmatrix} \begin{pmatrix} I & O \\ -CA^{-1} & I \end{pmatrix} \begin{pmatrix} c_1 \\ c_2 \\ \dots \\ c_k \end{pmatrix}$$

That is, the solution $R^{-1} \cdot c$ may be calculated through an arithmetic operation by computing inverse matrices of the sub-block matrices of the matrix R and inverse matrices of combinations of the sub-block matrices, instead of the entire inverse matrix of the matrix R. Specifically, the solution $R^{-1} \cdot c$ may be calculated through an arithmetic operation by computing the two inverse matrices, $A^{-1}$ and $[D-CA^{-1}B]^{-1}$.

When $c_f = (c_1, \ldots, c_{k/2})^T$ and $c_l = (c_{k/2+1}, \ldots, c_k)^T$, $c = c_f \| c_l$ (where an operator "$\|$" means continuous concatenation of two vectors) may be defined. When two terms on the right side of Equation 6 are calculated through an arithmetic operation, Equation 7 that follows may be obtained.

$$\begin{pmatrix} I & O \\ -CA^{-1} & I \end{pmatrix} [c_f \| c_l] = d = d_f \| d_l \qquad \text{[Equation 7]}$$

$$d_f = c_f$$

$$d_l = -C[A^{-1} \cdot c_f] + c_l$$

Equation 8 that follows may be obtained by substituting a result from Equation 7 into Equation 6.

$$r = e_f \| e_l = \begin{pmatrix} A^{-1} & O \\ O & [D-CA^{-1}B]^{-1} \end{pmatrix} [d_f \| d_l] \qquad \text{Equation 8}$$

$$e_f = A^{-1} \cdot d_f$$

$$e_l = [D-CA^{-1}B]^{-1} \cdot d_l$$

As expressed in Equation 9 that follows, $x=x_f \| x_l$ that is the solution to the linear system R·x=c may be computed by substituting the result from Equation 8 into Equation 6.

$$x = x_f \| x_l = \begin{pmatrix} I & -A^-B \\ O & I \end{pmatrix} [e_f \| e_l] \qquad \text{Equation 9}$$

$$x_f = e_f - A^{-1}[B \cdot e_l]$$

$$x_l = e_l$$

According to the embodiments of the present disclosure, the solution $x=R^{-1} \cdot c$ may be obtained without directly computing the matrix $R^{-1}$ in order to obtain the solution to the linear system R·x=c. Particularly, according to the embodiments of the present disclosure, $R^{-1} \cdot c$ may be efficiently computed without directly obtaining an inverse matrix of an arbitrary square block matrix R with k (k is an even number) rows and k columns, Specifically, according to the embodiments of the present disclosure, the solution $x=R^{-1} \cdot c$ may be computed by computing the inverse matrix of at least one of the sub-block matrices of the block matrix R and the inverse matrix of at least one of the combinations of the sub-block matrices.

In the related art, in order to compute the solution to the linear system R·x=c that is expressed as the matrix R with a magnitude of k, the inverse matrix of the matrix R needs to be directly computed using the Gaussian elimination method or the like widely known. Thus, a complexity of approximately, $O(k^3)$ is required. In contrast, according to the embodiments of the present disclosure, the solution to the linear system R·x=c may be computed by computing only the inverse matrix of the sub-block matrix (and the combination of the sub-block matrices) of the matrix R, without directly computing the inverse matrix of the matrix R. Accordingly, the effect of reducing the complexity to $O((k/2)^3)$ can be achieved.

The method of computing the solution to the linear system according to the embodiments of the present disclosure may be applied to a field other than the field of the generation of the electronic signature and may be realized independently. For example, the method of computing the solution to the linear system according to the embodiments of the present disclosure may be performed independently by an electronic device or may be realized in the form of a program executable by the electronic device. That is, the electronic device may include a memory configured to store data, and a processor configured to performs a plurality of operations by executing instructions. The processor may perform the method of computing the solution to the linear system according to the embodiments of the present disclosure (the method that is described with reference to FIG. 5).

FIG. 6 is a flow chart illustrating the method of computing the solution to the linear system according to the embodiments of the present disclosure. The method of computing the solution to the linear system that is described with reference to FIG. 6 may be performed by the signature device 200. The signature device 200 may compute the solution to the linear system R·x=c that is expressed as the matrix R. The linear system, as illustrated in FIG. 4, may be a linear system that is derived from the central map and the hash value in generating the electronic signature G. At this point, $$R = \begin{pmatrix} A & B \\ C & D \end{pmatrix},$$

and A, B, C, and D are square matrices, each with k/2 rows and k/2 columns. In addition, $c=(c_1, \ldots, c_k)^T$, $c_f=(c_1, \ldots, c_{k/2})^T$, and $c_l=(c_{k/2+1}, \ldots, c_k)^T$.

The signature device 200 stores the 4 sub-block matrices A, B, C, and D that constitute the matrix R (S310). According to the embodiments of the present disclosure, the signature device 200 may configure the sub-block matrices A, B, C, and D by grouping components of the block matrix R by column and row. Then, the signature device 200 may store the sub-block matrices A, B, C, and D.

The signature device 200 computes $d_f=c_f$ and $d_l=-C[A^{-1}·c_f]+c_l$(S320). According to the embodiments of the present disclosure, the signature device 200 may compute the above-mentioned values by directly deriving an inverse matrix $A^{-1}$ of A using the Gaussian elimination method and thus computing $A^{-1}·c_f$. Alternatively, the signature device 200 may compute $A^{-1}·c_f$ using the method (Equations 4 to 9) of computing the solution to the linear system according to the embodiments of the present disclosure. In this case, the matrix A also has to have an even number of ranks. According to the embodiments of the present disclosure, the signature device 200 may store $A^{-1}·c_f$.

The signature device 200 computes $e_f=A^{-1}·d_f$ and $e_l=[D-CA^{-1}B]^{-1}·d_l$(S320). All the above-mentioned values are results from multiplication of the inverse matrix by a specific vector. The above-mentioned values may be computed without directly computing the inverse matrices, using the method (Equations 4 to 9) of computing the solution to the linear system according to the embodiments of the present disclosure. According to the embodiments of the present disclosure, the signature device 200 may read and use $A^{-1}·c_f$ that is derived and stored in Step S310. In addition, the signature device 200 may store $[D-CA^{-1}B]^{-1}C[A^{-1}·c_f]$ and $[D-CA^{-1}B]^{-1}·c_l$ that are derived in the computing.

The signature device 200 computes $x_f=e_f-A^{-1}[B-e_l]$ and $x_l=e_l$ that are solutions to the linear system (S240). All the above-mentioned values are results from multiplication of the inverse matrix by a specific vector. The above-mentioned values may be computed without directly computing the inverse matrices, using the method (Equations 4 to 9) of computing the solution to the linear system according to the embodiments of the present disclosure. According to the embodiments of the present disclosure, the signature device 200 may read and use $A^{-1}·c_f$, $[D-CA^{-1}B]^{-1}C[A^{-1}·c_f]$, and $[D-CA^{-1}B]^{-1}·c_l$ that are derived and stored in S310 and S320.

In the embodiments of the present disclosure, the effect of directly calculating through an arithmetic operation the solution to the linear system without computing the inverse matrix of the matrix representing the linear system can be achieved.

However, the technical idea of the present disclosure is described above only in an exemplary manner. It is apparent to a person of ordinary skill in the art to which the present disclosure pertains that various alterations and modifications are possibly made to the embodiments of the present disclosure without departing from the nature and gist of the present disclosure. Therefore, the embodiments of the present disclosure that are disclosed in the present specification are for describing, rather than limiting, the technical idea of the present disclosure and do not impose any limitation on the scope of the technical idea of the present disclosure. Accordingly, the scope of protection of the present disclosure should be defined by the following claims. All technical ideas that fall within the scope equivalent thereto should be interpreted to be included within the scope of the claims of the present disclosure.

The device (unit) described above may be realized as a hardware element and/or a software element. Examples of the hardware element may include a microphone, an amplifier, a bandpass filter, and an A/D converter, and a processing device. For example, like a processor, a controller, an arithmetic logic unit (ALU), a digital signal processor, a microprocessor, a field programmable gate array (FPGA), a programmable logic unit (PLU), a microprocessor, or a device capable of responding to an instruction and executing the instruction in a defined manner, a processing device may be realized using one or more general-purpose computers or a special purpose computer. The processing device may enable an operating system (OS) to operate and may execute one or more software applications running on the operating system. In addition, the processing device may access, store, operate, process, and generate data in response to execution of the software application. For brief description, one processing device may be taken as an example. However, it would be apparent to a person of ordinary skill in the art that the processing device may include a plurality of processing elements and/or a plurality of types of processing elements. For example, the processing unit may include a plurality of processors or may include a process and a controller. In addition, it is also possible that a processor other than a parallel processor is configured.

The software application includes a computer program, a code, an instruction, or a combination thereof. With the software application, the processing device may be configured independently or collectively in such a manner as to operate in a desired manner and may be instructed to operate in a desired manner. The software application and the data may be interpreted by the processing device or may be permanently or temporarily embodied in the form of a propagating signal wave over which the instruction or data can be provided to the processing device, or on various types of machines, components, physical devices, virtual equipment, and computer-readable storage media or devices. The software application may be distributed on computer systems connected over a network and may be stored and executed in a distributed manner. The software application and the data may be stored on a recording media that is readable by one or more computer. The recording mediums include a data recording device on which the data are recorded and which is readable later by a computer system or a processing device. The method according to the embodiments of the present disclosure may be realized in the form of program instructions that are executable through various computer means, and thus may be recorded on a computer-readable medium. Examples of the computer-readable medium include a ROM, a RAM, a CD-ROM, and a magnetic tape, a floppy disc, and an optical data storage device. Moreover, the examples of the computer-readable medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, on which program instructions are specially configured to be stored and executed. In addition, functional programs, codes, and code segments that implement the above-disclosed examples may be easily understood and realized by a programmer of ordinary skill in the art to which the above-disclosed examples pertains, on the basis of the description provided herein with reference to the flowchart and the block diagram in the drawings or using the description provided herein.

The terminal or the device described herein, although it may not find application in diverse fields, may find application in mobile devices, such as a cellular telephone, a PDA, a digital camera, a portable game console, an MP3 player, a portable/personal multimedia player (PMP), a portable e-book, a portable laptop PC, a GPS navigation system, a tablet PC, and a sensor, and in a desktop PC, a HDTV, an optical disk player, a set-top box, a home appliance, and devices capable of performing wireless communication and network communication.

The compute-readable medium may contain a program instruction, a data file, a data structure, and the like individually, alone or in combination. The program instruction that is recorded on the medium may be a program instruction that is specially designed and configured to practice the embodiments of the present disclosure or may be a program instruction that is known and available to a person of ordinary skill in the software field. Examples of the program instruction include not only machine language codes that are generated by a compiler, but also high-level language codes that are executable by a computer using an interpreter or the like. The above-described hardware device may be configured in such a manner as to operate as one or more software modules in order to perform the operation in the embodiments of the present disclosure. Conversely, one or more software modules may be configured in such a manner as to operate as the above-described hardware device in order to perform the operation in the embodiments of the present disclosure.

The various embodiments of the present disclosure are described above. However, it should be understood that various modifications are possibly made thereto. For example, suitable results can be achieved although the steps described above is performed in a different order than described above, and/or although the elements of each of the system, the structure, the circuit, and the like are combined with each other in a different way than described above or are each replaced with or supplemented by a different element or an equivalent. Therefore, these modifications fall within the scope of the following claims.

The invention claimed is:

1. An electronic device configured to generate an electronic signature under a multivariate quadratic cryptography defined by maps including a central map F and an invertible map T, the device comprising:

a communication circuit configured to transmit and receive data;

a memory configured to store data for generating the electronic signature; and a processor configured to perform a plurality of operations by executing instructions, wherein the plurality of operations include:

storing a secret key containing the central map and the invertible map in the memory;

and generating the electronic signature for a message using the stored secret key, wherein the central map F that is expressed as o multivariate quadratic polynominals ($f^{(1)}$, $f^{(2)}$, . . . , $f^{(o)}$) that are defined in a first index set V={1, 2, . . . v} and a second index set O={v+1, v+2, . . . v+o} (where v and o are natural numbers) wherein the o multivariate quadratic polynominals ($f^{(1)}$, $f^{(2)}$, . . . , $f^{(o)}$) have a form in which a multivariate quadratic system that is represented by a linear system represented by a matrix R when an arbitrary variable is substituted into the multivariate quadratic system, wherein the plurality of operations further include operations performed before the generating the electronic signature, including:

deriving sub-block matrices A, B, C and D that constitute the matrix R by grouping components of the matrix R by column and row, the matrix R with k rows and k columns (k is even) and the sub-block matrices A, B, C and D each with k/2 rows and k/2 columns, storing components of each of the sub-block matrices A, B, C and D;

computing the information on $A^{-1}$ and $[D-CA^{-1}B]^{-1}$; and storing the information on $A^{-1}$ and $[D-CA^{-1}B]^{-1}$ in the memory, wherein the generating the electronic signature comprises:

reading the message m to be signed;

computing a variable y based on the message and a predetermined hash function;

computing a first result value $F^{-1}(y)$ by solving the linear system of the matrix R, where $F^{-1}$ is an inverse map of the central map F; and, generating the electronic signature based on the first result value $F^{-1}(y)$, s wherein the solving the linear system of the matrix R is performed without calculating an inverse matrix $R^{-1}$ of the matrix R by:

reading information on $A^{-1}$ and $[D-CA^{-1}B]^{-1}$ from the memory; and computing the first result value $F^{-1}(y)$ using the variable y and stored information on $A^{-1}$ and $[D-CA^{-1}B]^{-1}$.

2. The electronic device of claim 1, wherein the central map F is defined as F=($f^{(1)}$, $f^{(2)}$, . . . , $f^{(o)}$) that is $F:F_q{}^n \rightarrow F_q{}^m$ (m=0) and wherein the o multivariate quadratic polynominals ($f^{(1)}$, $f^{(2)}$, . . . , $f^{(o)}$) are defined according to, $$f^{(l)}(x) = f^{(l)}_{OV} + f^{(l)}_{V} + f^{(l)}_{L,C} (l = 1, 2, \ldots o)$$

$$f^{(k)}_{OV} = \sum\nolimits_{i \in 0, j \in V} \alpha^{(k)}_{ij} x_i x_j$$

$$f^{(k)}_{V} = \sum\nolimits_{i, j \in V, i \le j} \beta^{(k)}_{ij} x_i x_j$$

$$f^{(k)}_{L,C} = \sum\nolimits_{i \in V \cup 0} \gamma^{(k)}_{i} x_i + \eta^{(k)}_{i}$$

(where $\alpha_{ij}{}^{(l)}$, $\beta_{ij}{}^{(l)}$, $\gamma_{ij}{}^{(l)}$ and $\eta_i{}^{(l)}$ are elements of $F_q$, and q is a natural number that is equal to or greater than 1).

3. The electronic device of claim 2, wherein some coefficients contained at least one polynomial of the polynomials $f_{OV}{}^{(k)}$ and $f_V{}^{(k)}$ are zero.

4. The electronic device of claim 3, wherein non-zero the other coefficients of the at least one polynomial are determined in such a manner that a rank of a matrix corresponding to a quadratic terms of the at least one polynomial is full rank.

5. The electronic device of claim 1, wherein the generating of the electronic signature further comprises:

computing a second result value $T^{-1}(F^{-1}(y))$, where $T^{-1}$ is an inverse map of the invertible map T; and generating the second result value $T^{-1}(F^{-1}(y))$ as the electronic signature on the message.

6. The electronic device of claim 5, wherein the computing of the first result value $F^{-1}(y)$ comprises:

generating an arbitrary variable $s_V=(s_1, s_2, \ldots, s_v) \in F_q{}^v$;

deriving the linear system of the matrix R, $R \cdot x_o = c$ for a variable $x_o=(x_{v+1}, x_{v+2}, \ldots, x_{v+o}) \in F_q{}^o$ by substituting the generated variable $s_V$ into $x \in F_q{}^m$ of Equation F(x), determining a solution to the linear system; and computing the first result value $F^{-1}(y)$ using the solution $x_o$ to the linear system and the arbitrary variable $s_V$.

7. The electronic device of claim 6, wherein the determining of the solution to the linear system further comprises:

determining $x_o=(x_{v+1}, x_{v+2}, \ldots, x_{v+o})^T$ that is the solution to the linear system, by using the stored information on $A^{-1}$ and $[D-CA^{-1}B]^{-1}$.

8. The electronic device of claim 7, wherein the determining of the solution to the linear system further comprises:

computing $A^{-1} \cdot c_f$ and $[D-CA^{-1}B]^{-1} \cdot c_l$ (where $c=(c_1, c_2, \ldots, c_o)$, $c_f=(c_1, \ldots, c_{o/2})^T$ and $c_l=(c_{o/2+1}, \ldots, c_o)^T$; and computing the solution to the linear system based on $A^{-1} \cdot c_f$ and $[D-CA^{-1}B]^{-1} \cdot c_l$.

9. A method performed by an electronic device for generating an electronic signature under a multivariate quadratic cryptography defined by maps including a central map F and an invertible map T, the method comprising:

storing a secret key containing the central map and the invertible map stored in the memory; and generating the electronic signature for a message using the stored secret key, wherein the central map F that is expressed as o multivariate quadratic polynominals ($f^{(1)}, f^{(2)}, \ldots, f^{(o)}$) that are defined in a first index set V={1, 2, ... v} and a second index set O={v+1, v+2, ... v+o} (where v and o are natural numbers), wherein the o multivariate quadratic polynominals ($f^{(1)}, f^{(2)}, \ldots, f^{(o)}$) have a form in which a multivariate quadratic system that is represented by a linear system represented by a matrix R when an arbitrary variable is substituted into the multivariate quadratic system, wherein the method further includes steps performed before the generating the electronic signature, including:

deriving sub-block matrices A, B, C and D that constitute the matrix R by grouping components of the matrix R by column and row, the matrix R with k rows and k columns (k is even) and the sub-block matrices A, B, C and D each with k/2 rows and k/2 columns, storing components of each of the sub-block matrices A, B, C and D;

computing the information on $A^{-1}$ and $[D-CA^{-1}B]^{-1}$; and storing the information on $A^{-1}$ and $[D-CA^{-1}B]^{-1}$, wherein the generating the electronic signature comprises:

reading the message m to be signed;

computing a variable y based on the message and a predetermined hash function;

computing a first result value $F^{-1}(y)$ by solving the linear system of the matrix R, where $F^{-1}$ is an inverse map of the central map F; and generating the electronic signature based on the first result value $F^{-1}(y)$, wherein the solving the linear system of the matrix R is performed without calculating an inverse matrix $R^{-1}$ of the matrix R, by:

reading information on $A^{-1}$ and $[D-CA^{-1}B]^{-1}$ from the memory; and computing the first result value $F^{-1}(y)$ using the variable y and stored information on $A^{-1}$ and $[D-CA^{-1}B]^{-1}$.

10. The method of claim 9, wherein the central map F is defined as $F=(f^{(1)}, f^{(2)}, \ldots, f^{(o)})$ that is $F:F_q{}^n \to F_q{}^m$ (m=0) and wherein the o multivariate quadratic polynominals ($f^{(1)}, f^{(2)}, \ldots, f^{(o)}$) are de according to, $$f^{(l)}(x) = f_{OV}^{(l)} + f_V^{(l)} + f_{L,C}^{(l)} (l = 1, 2, \ldots o)$$

$$f_{OV}^{(k)} = \sum_{i \in 0, j \in V} \alpha_{ij}^{(k)} x_i x_j$$

$$f_V^{(k)} = \sum_{i,j \in V, i \leq j} \beta_{ij}^{(k)} x_i x_j$$

$$f_{L,C}^{(k)} = \sum_{i \in V \cup 0} \gamma_i^{(k)} x_i + \eta_i^{(k)}$$

(where $\alpha_{ij}^{(l)}$, $\beta_{ij}^{(l)}$, $\gamma_{ij}^{(l)}$ and $\eta_i^{(l)}$ are elements of $F_q$, and q is a natural number that is equal to or greater than 1).

11. The method of claim 9, wherein some coefficients contained at least one polynomial of the polynomials $f_{OV}^{(k)}$ and $f_V^{(k)}$ are zero.

12. The method of claim 11, wherein non-zero the other coefficients of the at least one polynomial are determined in such a manner that a rank of a matrix corresponding to a quadratic terms of the at least one polynomial is full rank.

13. The method of claim 9, wherein the generating of the electronic signature further comprises:

computing a second result value $T^{-1}(F^{-1}(y))$, where $T^{-1}$ is an inverse map of the invertible map T; and generating the second result value $T^{-1}(F^{-1}(y))$ as the electronic signature on the message.

14. The method of claim 13, wherein the computing of the first result value $F^{-1}(y)$ comprises:

generating an arbitrary variable $s_V=(s_1, s_2, \ldots, s_V) \in F_q{}^v$, deriving the linear system of the matrix R, $R \cdot x_o = c$ for a variable $x_o=(x_{v+1}, x_{v+2}, \ldots, x_{v+o}) \in F_q{}^o$ by substituting the generated variable $s_V$ into $x \in F_q{}^m$ of Equation F(x), determining a solution to the linear system; and computing the first result value $F^{-1}(y)$ using the solution $x_o$ to the linear system and the arbitrary variable $s_V$.

15. The method of claim 14, wherein the determining of the solution to the linear system further comprises:

determining $x_o=(x_{v+1}, x_{v+2}, \ldots, x_{v+o})^T$ that is the solution to the linear system, by using the stored information on $A^{-1}$ and $[D-CA^{-1}B]^{-1}$.

16. The method of claim 15, wherein the determining of the solution to the linear system further comprises:

computing $A^{-1} \cdot c_f$ and $[D-CA^{-1}B]^{-1} \cdot c_l$ (where $c=(c_1, c_2, \ldots, c_o)^T$, $c_f=(c_1, \ldots, c_{o/2})^T$ and $c_l=(c_{o/2+1}, \ldots, c_o)^T$; and computing the solution to the linear system based on $A^{-1} \cdot c_f$ and $[D-CA^{-1}B]^{-1} \cdot c_l$.

* * * * *